US011403413B2

(12) United States Patent
Ojha et al.

(10) Patent No.: US 11,403,413 B2
(45) Date of Patent: Aug. 2, 2022

(54) AVOIDING USER SESSION MISCLASSIFICATION USING CONFIGURATION AND ACTIVITY FINGERPRINTS

(71) Applicant: Box, Inc., Redwood City, CA (US)

(72) Inventors: Alok Ojha, Newark, CA (US); David Vengerov, San Jose, CA (US); Benjamin Draffin, Redwood City, CA (US); Sesh Jalagam, Union City, CA (US)

(73) Assignee: Box, Inc.

( * ) Notice: Subject to any disclaimer, the term of this patent is extended or adjusted under 35 U.S.C. 154(b) by 158 days.

(21) Appl. No.: 16/553,106

(22) Filed: Aug. 27, 2019

(65) Prior Publication Data

US 2020/0092298 A1    Mar. 19, 2020

Related U.S. Application Data

(60) Provisional application No. 62/723,314, filed on Aug. 27, 2018.

(51) Int. Cl.
*H04L 29/06*    (2006.01)
*G06F 21/62*    (2013.01)
(Continued)

(52) U.S. Cl.
CPC .......... *G06F 21/6218* (2013.01); *G06F 16/11* (2019.01); *G06F 21/53* (2013.01);
(Continued)

(58) Field of Classification Search
None
See application file for complete search history.

(56) References Cited

U.S. PATENT DOCUMENTS

2015/0089575 A1    3/2015   Vepa et al.
2016/0070758 A1    3/2016   Thomson et al.
(Continued)

OTHER PUBLICATIONS

International Search Report and Written Opinion dated Dec. 11, 2019 for corresponding PCT Application No. PCT/US19/48435.
(Continued)

*Primary Examiner* — Cai Y Chen
(74) *Attorney, Agent, or Firm* — Vista IP Law Group, LLP

(57) ABSTRACT

Methods, systems and computer program products for computing system security. Techniques for classifying a potentially unauthorized user as an authorized user involve comparisons of two or more access request times that occur at different computing devices in different geographical locations. Based on those comparisons and the distance between the geographical locations of the different computing devices, a determination is made as to whether or not travel (e.g., via overland travel, via air travel, etc.) between those different geographical locations can be reasonably accomplished within a given time period. If it is determined that the required time for travel between the different geographical locations is greater than the time between the access request times—thus suggesting a spoofing attack or other malfeasance—then the potentially unauthorized (i.e., only potentially malfeasant) access can still be deemed as an authorizable access request by analyzing browser configurations and activity patterns of the potentially unauthorized user.

20 Claims, 10 Drawing Sheets

(51) Int. Cl.
    *G06F 16/11*     (2019.01)
    *G06F 21/53*     (2013.01)
    *H04L 9/40*      (2022.01)
    *H04L 67/06*     (2022.01)
    *H04L 67/55*     (2022.01)
    *G06N 20/00*     (2019.01)
    *G06N 5/04*      (2006.01)
    *G06F 21/57*     (2013.01)

(52) U.S. Cl.
    CPC ........ *G06F 21/577* (2013.01); *G06F 21/6227* (2013.01); *G06N 5/04* (2013.01); *G06N 20/00* (2019.01); *H04L 63/102* (2013.01); *H04L 63/105* (2013.01); *H04L 63/107* (2013.01); *H04L 63/1416* (2013.01); *H04L 63/1466* (2013.01); *H04L 67/06* (2013.01); *H04L 67/26* (2013.01); *G06F 2221/034* (2013.01)

(56) References Cited

U.S. PATENT DOCUMENTS

2018/0114015 A1    4/2018  Nuseibeh et al.
2019/0289016 A1*   9/2019  Malan ................... H04W 4/023

OTHER PUBLICATIONS

European Search Report dated Sep. 23, 2021 for corresponding EP Application No. 19853611.2.

* cited by examiner

AVOIDING USER SESSION MISCLASSIFICATION USING CONFIGURATION AND ACTIVITY FINGERPRINTS

CROSS-REFERENCE TO RELATED APPLICATION(S)

The present application claims the benefit of priority to U.S. Patent Application Ser. No. 62/723,314 titled "COLLABORATION SYSTEM SECURITY", filed on Aug. 27, 2018, which is hereby incorporated by reference in its entirety.

FIELD

This disclosure relates to computing system security, and more particularly to techniques for avoiding user session misclassification by using configuration and activity fingerprints.

BACKGROUND

Modern computing environments often support a wide range of computing devices that communicate with one another in a variety of ways and for a variety of purposes. One of these purposes is to share information between the different computing devices. Such sharing often involves a request issued from a first computing device to access the resources at a second computing device. As an example, when a user navigates to a public web page using the browser of a user device (e.g., mobile phone, laptop computer, etc.), a request for the web page is issued to a web server. If the user and/or the user device is authorized to view the web page, the content of the web page is delivered by the web server for presentation at the user device.

As compared to authorizing access to publicly available resources (e.g., the public web page of the foregoing example), authorizing access to secure resources is more complex. Specifically, a computing system must not only identify that a user issuing a resource access request is authorized to access the resource, but also the computing system must determine whether the request is issued from the actual user or a person posing as the user (e.g., in a spoofing attack).

As an example, multiple users might interact with a cloud-based computing system to access various content objects (e.g., documents, photos, videos, etc.) owned by the users and managed at the computing system. In observance of sharing policies that cover the content objects, the computing system must provision access only to the actual user (or users) who are authorized to access the content object. This situation is made even more complicated by the explosion of the variety of user devices and resource access methods that the users might employ to access their secure resources. Any particular user might have several user devices (e.g., laptop computer, mobile phone, tablet computer, desktop computer, public computer, etc.) that the user might employ to access their resources. Moreover, a user might connect to the computing system through a direct connection (e.g., public Internet connection, private intranet connection, etc.), or via a virtual private network (VPN), or via an application or application service, or via an anonymizing browser (e.g., Tor), and/or via any another resource access method. The expectation of the users is that they be free to use any of such varieties of user devices and/or resource access methods, while their secure content remains protected against spoofing attacks.

Unfortunately, mechanisms for accurately distinguishing between a spoofing attack and authorized users are deficient—especially when users employ a wide variety of user devices and/or resource access methods to access secure resources. As an example, one deficient approach uses the IP address associated with a resource access request to determine whether the request was issued by an authorized user. In many situations, this deficient approach would falsely misclassify the user as unauthorized. To illustrate, consider an authorized user issuing a first resource access request from a first IP address associated with a first region, and then issuing a second resource access request from a second IP address associated with a second region. In accordance with conventional techniques, if the second request was issued at a time after the first request during which time it is deemed that travel from the first region to the second region was not feasible, the user issuing the second request would be identified as an unauthorized user (e.g., a person posing as an authorized user). However, if it were the case that the second request was issued from the server of a VPN that is assigned the second IP address, and if it were the case that the user was an authorized user of that VPN, then, in accordance with conventional techniques, that authorized user might be falsely identified as an unauthorized user. What is needed is a way to reduce or eliminate false identification of an authorized user as an unauthorized user.

SUMMARY

The present disclosure describes techniques used in systems, methods, and in computer program products for determining user classifications using a user's computer-tracking fingerprints such as configuration and activity fingerprints. The disclosed techniques advance the relevant technologies to address technological issues with legacy approaches. Certain embodiments are directed to technological solutions for analyzing the fine-grained configuration and activity information associated with resource access events to accurately differentiate unauthorized users from authorized users.

The disclosed embodiments modify and improve over legacy approaches. In particular, the herein-disclosed techniques provide technical solutions that address technical problems that result in falsely identifying authorized users' sessions as being unauthorized in the presence of a variety of user devices and resource access methods.

Many of the herein-disclosed embodiments for analyzing the fine-grained configuration and activity information associated with resource access events to accurately classify authorized versus unauthorized users are technological solutions pertaining to technological problems that arise in the hardware and software arts that underlie collaboration systems and the many ways that users can interaction with a collaboration system from multiple user sessions. In addition to reduction or elimination of false identification of an authorized user session as an unauthorized user session, various aspects of the present disclosure achieve performance and other improvements in peripheral technical fields including (but not limited to) user session authentication as well as technical fields pertaining to user-authorized tracking of collaboration system activities.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
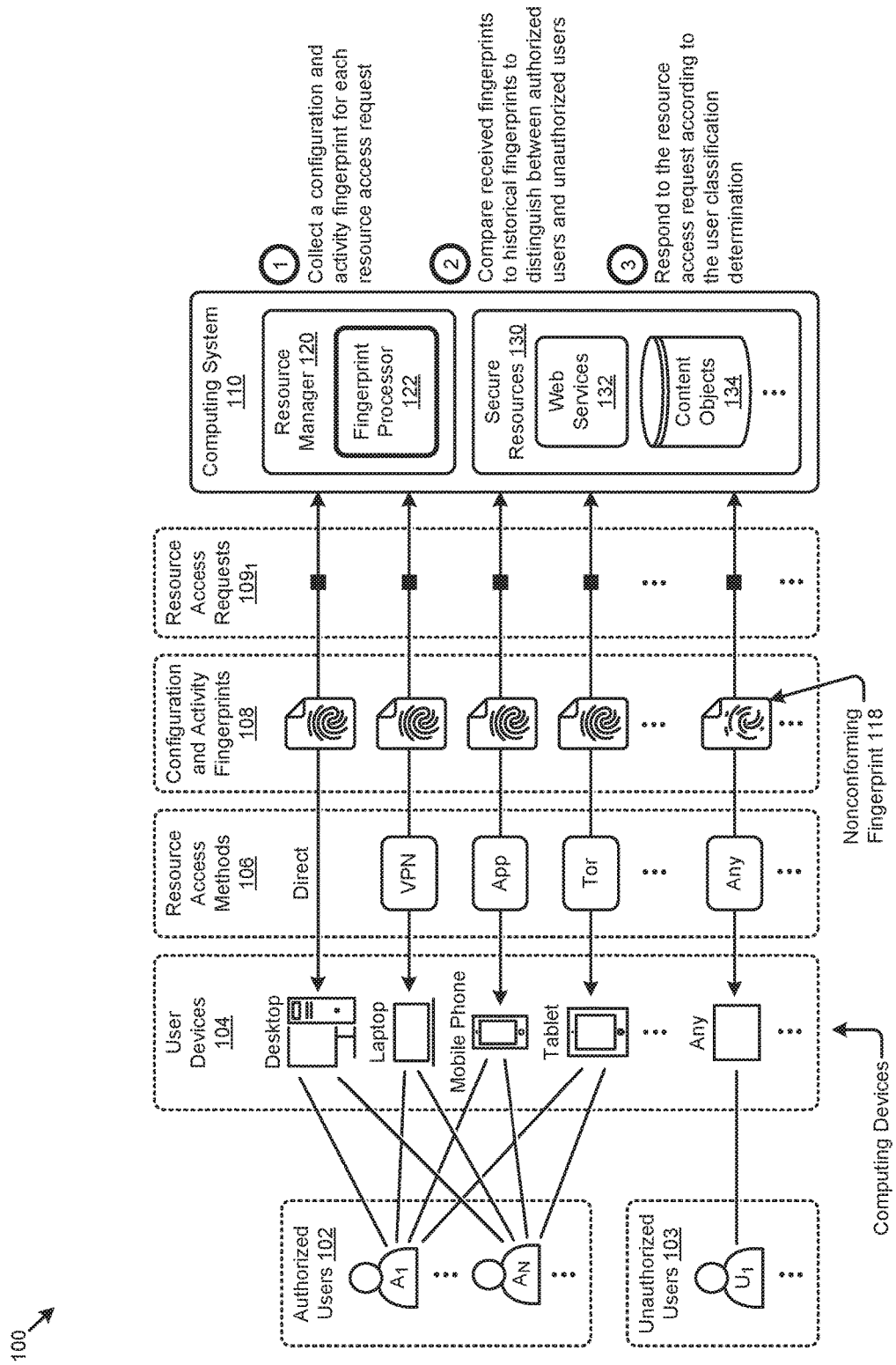
FIG. 1 illustrates a computing environment in which embodiments of the present disclosure can be implemented.

Aspects of the present disclosure serve to eliminate or reduce the chance of falsely identifying authorized users as unauthorized users, even in the presence of a variety of user devices and resource access methods. The problem of falsely identifying authorized users as unauthorized users is unique to, and may have been created by, various computer-implemented methods that classify users in the context of collaboration systems. The accompanying figures and discussions herein present example environments, systems, methods, and computer program products for correctly identifying an authorized user based on the user's browser and/or computer configuration fingerprints, and/or based on the user's activity fingerprints.

Overview

Disclosed herein are techniques for analyzing fine-grained configuration and activity fingerprints associated with resource access events to accurately distinguish between authorized users and unauthorized users. In certain embodiments, sets of configuration attributes associated with resource access requests issued by various users to a computing system (e.g., a resource owner or a manager) are collected. Such configuration attributes describe certain characteristics associated with the user devices from which the resource access requests are issued. For example, the configuration attributes might describe a browser type, a browser version, a device identifier, an application identifier, and/or other user device characteristics. These configuration attributes are combined (e.g., hashed) into a configuration and activity fingerprint that is provided with resource access requests. When a newly issued resource access request is received from a user, the configuration and activity fingerprint associated with the request is compared to other configuration and activity fingerprints associated with the same user. The user is then determined to be an authorized user or is determined to be an unauthorized user based at least in part on the outcome of the comparison.

In certain embodiments, the configuration and activity fingerprint comparison is performed by applying a fingerprint to a predictive model that generates an outcome indicating a probability that the user is either an authorized user or an unauthorized user. In certain embodiments, the configuration and activity fingerprint comparison technique is combined with other techniques (e.g., "impossible travel" technique, etc.) to determine whether the user is an authorized user or an unauthorized user.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to analyzing the fine-grained configuration and activity fingerprints associated with resource access events to accurately distinguish between authorized users and unauthorized users. Specifically, the figure presents a logical depiction of how the herein disclosed techniques can be used in a computing environment to distinguish between authorized users and unauthorized users who issue resource access requests from a wide variety of user devices and via a wide variety of resource access methods.

The logical depiction of FIG. 1 illustrates a selected set of authorized users 102 (e.g., authorized user $A_1$, . . . , authorized user $A_N$) that issue instances of resource access requests 1091 to a computing system 110 to access various instances of secure resources 130 that are maintained by computing system 110. As shown, secure resources 130 might comprise various instances of web services 132 (e.g., web sites, web applications, etc.), instances of content objects 134 (e.g., electronic documents, photos, videos, etc.), and/or other resources at computing system 110.

As earlier mentioned, computing system 110 is tasked with provisioning access to secure resources 130 only to the actual users (e.g., authorized users 102) that are authorized to access the resources. This situation is made more complicated by the variety of user devices 104 and resource access methods 106 that might be used by authorized users 102 to access the secure resources 130. For example, a particular user might have several user devices (e.g., desktop computer, laptop computer, mobile phone, tablet computer, public computer, etc.) that the user might use to access their resources. Moreover, the user might connect to computing system 110 through a direct (e.g., public Internet, private intranet, etc.) connection, a virtual private network (VPN), an application (app) or application service, an anonymizing browser (e.g., Tor), and/or another resource access method.

The expectation of the authorized users 102 is that they be free to use any of such varieties of user devices 104 and/or resource access methods 106, while their secure resources remain protected against spoofing attacks. Such spoofing attacks, for example, involve one or more unauthorized users 103 (e.g., unauthorized user $U_1$, etc.) that are posing as one or more of the authorized users 102 and requesting access to secure resources 130 from any of the user devices 104 and over any of the resource access methods 106. In most cases, the unauthorized users 103 have the authentication credentials (e.g., username, password, etc.) of the authorized users 102, thus impacting the effectiveness of credential-based authentication techniques in identifying the unauthorized users 103. Responsive to the foregoing reduced effectiveness of credential-based authentication, certain other techniques have emerged. Unfortunately, many of such other techniques often falsely identify authorized users as unauthorized users—especially in environments that have a diverse set of user device and resource access method options.

As illustrated in computing environment 100, the herein disclosed techniques address such problems attendant to falsely identifying authorized users as unauthorized users by analyzing the fine-grained configuration and activity fingerprints associated with resource access requests to accurately distinguish between authorized users and unauthorized users. Specifically, and as shown, a fingerprint processor 122 is implemented at a resource manager 120 of computing system 110 to facilitate such techniques. As can be observed, instances of configuration and activity fingerprints 108 that are associated with respective instances of resource access requests 1091 are received at computing system 110 (operation 1). Such configuration and activity fingerprints, as used herein, are collections of features and/or attributes that characterize the environment (e.g., conditions, settings, etc.) from which a resource access request is issued. For example, a configuration and activity fingerprint might comprise configuration features that describe certain characteristics that pertain to the user device and/or the resource access method that are associated with a particular resource access request.

When a configuration and activity fingerprint corresponding to a newly issued resource access request is received, the configuration and activity fingerprint is compared to historical configuration and activity fingerprints at fingerprint processor 122 to determine whether an unauthorized user issued the request (operation 2). Various techniques can be implemented to perform the fingerprint comparisons. For example, heuristics might be used to compare the corresponding features of two or more fingerprints. In this case, a nonconforming fingerprint 118 that is substantially different (e.g., as determined by the heuristics) from historical configuration and activity fingerprints from an authorized user (e.g., $A_1$) might indicate that an unauthorized user (e.g., $U_1$) is posing as the authorized user. As another example, a predictive model might be implemented to predict the probability that the issuing user is the actual authorized user (e.g., and not a spoofing user) based at least in part on the features of the configuration and activity fingerprints. The information underlying the configuration and activity fingerprints might be combined through use of a hash function so as to improve the efficiency of the foregoing comparisons (e.g., merely the hash values are compared).

In accordance with the foregoing user identity determination, a response to the resource access request is issued (operation 3). For example, if the user issuing the request is determined to be the authorized user, then access to the requested resource is granted. If the user is determined to not be the authorized user, then access to the requested resource is denied. In some cases, one or more alerts might be sent to a resource owner and/or other parties (e.g., resource administrator) when an unauthorized attempt to access the resource is executed.

The accurate identification of unauthorized users facilitated by the herein disclosed techniques not only prevents unauthorized access to secure resources, but also minimizes or eliminates falsely identifying authorized users as unauthorized users, even when a plurality of user devices and/or resource access methods are used to access the resources.

Various techniques for identifying unauthorized users are disclosed in further detail as follows.

Figure 2A:
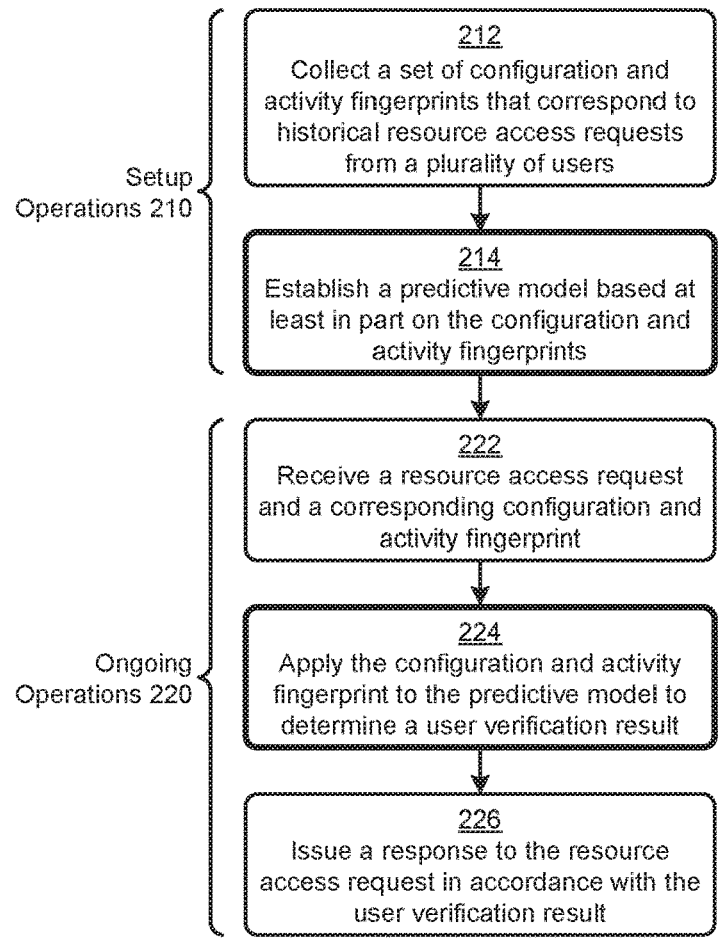
FIG. 2A exemplifies a user classification technique as implemented in systems that facilitate user classification using configuration and activity fingerprints, according to an embodiment.

FIG. 2A exemplifies a user classification technique 2A00 as implemented in systems that facilitate user classification using configuration and activity fingerprints. As an option, one or more variations of user classification technique 2A00 or any aspect thereof may be implemented in the context of the architecture and functionality of the embodiments described herein. The user classification technique 2A00 or any aspect thereof may be implemented in any environment.

FIG. 2A illustrates aspects pertaining to analyzing the fine-grained configuration and activity fingerprints associated with resource access events to accurately distinguish between authorized users and unauthorized users. Specifically, the figure is presented to illustrate one embodiment of certain steps and/or operations performed over a network of devices (e.g., user devices, computing systems, etc.) to apply configuration and activity fingerprints to a predictive model to verify whether a user is an authorized user or an unauthorized user. As can be observed, the steps and/or operations can be grouped into a set of setup operations 210 and a set of ongoing operations 220.

The setup operations 210 of user classification technique 2A00 commence by collecting a set of configuration and activity fingerprints that correspond to instances of historical resource access requests from a plurality of users (step 212). As an example, the fingerprints might be collected from users who interact with a computing system that manages the secure resources. These interactions (e.g., resource access requests) might be invoked under various configurations of user devices, browsers, applications, resource access methods, and/or under various environmental conditions. A predictive model is established based at least in part on the set of fingerprints associated with the historical resource access requests (step 214). As later described, the predictive model might be trained from the historical fingerprints and then updated as additional fingerprints are received and verified. More specifically, the predictive model might be trained from any data or information that is received with, or associated with, any individual user access request or from any sequence of user access requests. As merely one example, the predictive model might be trained from data that is received with a resource access request, and/or information pertaining to then-current conditions, and/or information that can be derived from time-wise and/or space-wise juxtaposition of a sequence of user access requests.

The ongoing operations 220 of user classification technique 2A00 commence by receiving a particular resource access request and a corresponding configuration and activity fingerprint (step 222). For example, the resource access request might be issued from an authenticated user (e.g., authenticated by login credentials) in the presence of some uncertainty as to whether the issuer is, in fact, the authenticated user or an unauthorized user posing as the authorized user. As earlier mentioned, such uncertainty might be due at least in part to the variety of configurations (e.g., user devices, resource access methods, other conditions, etc.) under which the resource access request might be issued.

According to the herein disclosed techniques, the configuration and activity fingerprints received with the resource access requests capture a fine-grained description of such configurations to facilitate an accurate determination of whether the issuer is an authorized user or an unauthorized user posing as an authorized user. Specifically, the configuration and activity fingerprint received with the resource access request is applied to the aforementioned predictive model to determine a user verification result (step 224). The user verification result is a quantitative measure derived from the outcome(s) of the predictive model that can be used to distinguish between an authorized user and an unauthorized user posing as an authorized user. In many cases, an increase in the features and/or details (e.g., granularity) captured in the fingerprints results in an increase in the accuracy of the user verification results. When hashing the fingerprints, for example, more granular features and/or details will result in more distinguishable hash values and fewer hash collisions, thereby increasing the accuracy of the user verification results derived from the hash values.

Based at least in part on the user verification result derived from the predictive model, a response to the resource access request is issued (step 226). For example, if the user verification result indicates that the user issuing the request is an authorized user, then access to the requested resource is granted. If the user verification result indicates that the user is not the authorized user, then access to the requested resource is denied. In some cases, one or more alerts might be sent to a resource owner and/or other parties (e.g., resource administrator) when an unauthorized attempt to access a resource is executed.

In certain embodiments, the herein techniques for accurately classifying authorized users from the fine-grained configuration and activity fingerprints associated with resource access events can be combined with other user identification and classification techniques. One such multi-stage user classification technique is disclosed in further detail as follows.

Figure 2B:
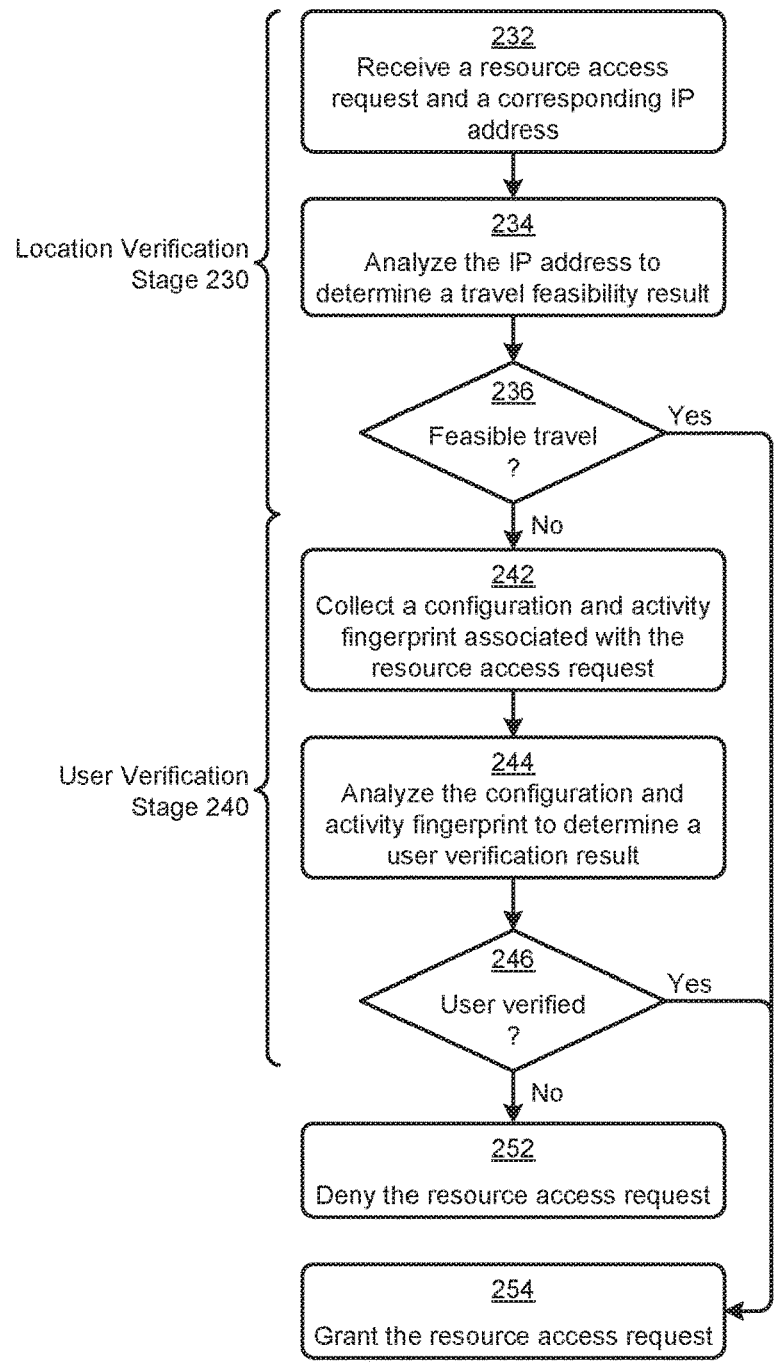
FIG. 2B depicts an example multi-stage user classification technique as implemented in systems that facilitate user classification using configuration and activity fingerprints, according to an embodiment.

FIG. 2B depicts an example multi-stage user classification technique 2B00 as implemented in systems that facilitate user classification using configuration and activity fingerprints. As an option, one or more variations of multi-stage user classification technique 2B00 or any aspect thereof may be implemented in the context of the architecture and functionality of the embodiments described herein. The multi-stage user classification technique 2B00 or any aspect thereof may be implemented in any environment.

FIG. 2B illustrates aspects pertaining to analyzing the fine-grained configuration and activity fingerprints associated with resource access events to accurately distinguish between authorized users and unauthorized users. Specifically, the figure is presented to illustrate one embodiment of certain steps and/or operations performed over a network of devices (e.g., user devices, computing systems, etc.) that apply two stages of verification to determine whether a user issuing a resource access request is an authorized user or an unauthorized user. As can be observed, portions of the steps and/or operations can be assigned to a location verification stage 230 and a user verification stage 240.

The location verification stage 230 of multi-stage user classification technique 2B00 commences upon receiving a resource access request from an assumed authorized user and upon receiving an IP address corresponding to the resource access request from the assumed authorized user (step 232). For example, the IP address might be the IP address assigned to the computing device of the user that issued the resource access request or some other computing device (e.g., virtual network server) associated with the resource access method (e.g., VPN) used to issue the resource access request. The IP address is analyzed to determine a travel feasibility result (step 234). Specifically, an IP geolocation table might be accessed to determine a then-current location associated with the IP address. The then-current location might then be compared to a previous location associated with the nearest earlier resource access request from the user. If the then-current location and the previous location are such that the user could have feasibly traveled between the two locations in the time between the two corresponding requests ("Yes" path of decision 236), then the resource access request is granted (step 254). If the then-current location and the previous location are such that user travel could not have feasibly been accomplished between the two locations given the time between the two corresponding requests ("No" path of decision 236), then the user verification stage 240 is invoked.

The information in the IP geolocation table can be combined with other information pertaining to geographies, travel distances, feasible travel modes, etc. As such, any of the foregoing information can be used to determine the time required, and/or whether or not travel between a first location and a second location, can be accomplished within a given time period. Furthermore, the information in the IP geolocation table in combination with other information pertaining to geographies, travel distances, etc. can be used to identify a potentially unauthorized access by a potentially unauthorized user (e.g., when user travel would be impossible using any known travel mode). Specifically, the time required to accomplish travel between a first location and a second location can be compared to time stamps of two or more access requests. The result of the comparison can be used to determine if the time period for travel that would be required to accomplish travel between the first location and the second location is greater than the time period between the two or more access requests. However, even when the time period required to accomplish travel between the first location and the second location is greater than the time period between the two or more access requests (e.g., suggesting malicious intent), the requesting user can still be deemed to be an authorized user based on the user's configuration and activity fingerprint. Techniques to do so are described herein. In particular some techniques to do so are shown and described as pertains to step 242 and step 244, infra.

In the user verification stage 240 of multi-stage user classification technique 2B00, a configuration and activity fingerprint associated with the resource access request is collected (step 242). The user's configuration and activity fingerprint are analyzed to determine a user verification result (step 244). For example, and as described in more detail herein, a predictive model might be implemented to predict the probability that the issuing user is the actual authorized user (e.g., and not a spoofing user) based at least in part on a hash value produced from the features of the configuration and activity fingerprint.

The user verification result is then derived from the foregoing probability outcome of the predictive model. As another example, heuristics might be used to compare the hash value and/or features of the configuration and activity fingerprint to the corresponding hash values and/or features of two or more earlier collected configuration and activity fingerprints associated with the user. In any case, if the analysis of the configuration and activity fingerprint produces a positive user verification result ("Yes" path of decision 246), then the resource access request is granted (step 254). If the analysis of the configuration and activity fingerprint produces a negative user verification result ("No" path of decision 246), then the resource access request is denied (step 252).

One embodiment of a system for implementing the user classification techniques of FIG. 2A and FIG. 2B is disclosed as follows.

Figure 3:
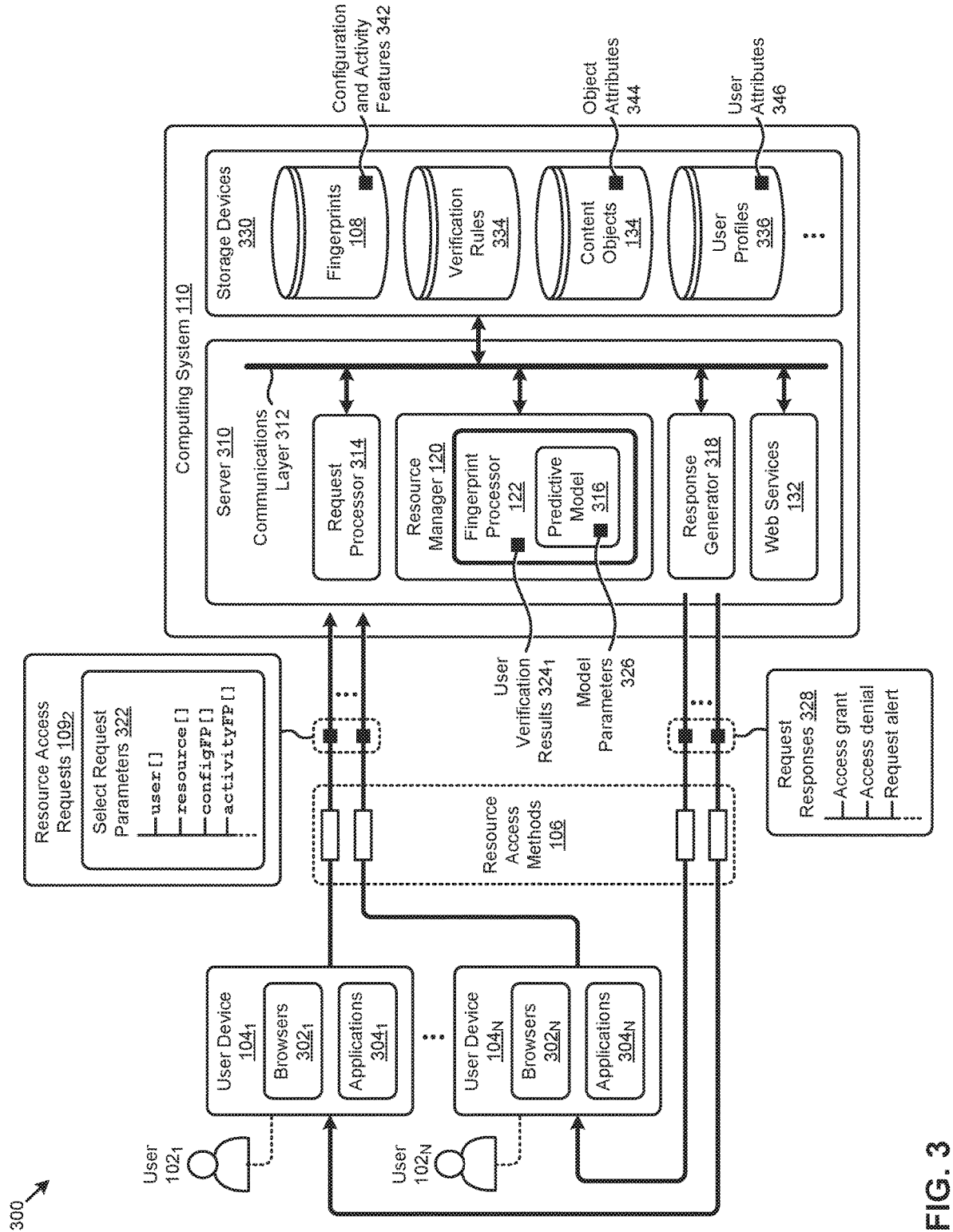
FIG. 3 is a block diagram of a resource access system that performs user classification using configuration and activity fingerprints, according to an embodiment.

FIG. 3 is a block diagram of a resource access system 300 that performs user classification using configuration and activity fingerprints. As an option, one or more variations of resource access system 300 or any aspect thereof may be implemented in the context of the architecture and functionality of the embodiments described herein. The resource access system 300 or any aspect thereof may be implemented in any environment.

FIG. 3 illustrates aspects pertaining to analyzing the fine-grained configuration and activity fingerprints associated with resource access events to accurately distinguish between authorized users and unauthorized users. Specifically, the figure is being presented to show one embodiment of certain representative components, data structures, and associated data flows that describe how the herein disclosed techniques might be implemented in the computing system. The components, data structures, and data flows shown in FIG. 3 present one partitioning and associated data manipulation approach. The specific example shown is purely exemplary, and other subsystems, data structures, and/or partitionings are reasonable.

As shown, resource access system 300 comprises an instance of fingerprint processor 122 implemented at resource manager 120 earlier described operating at an instance of a server 310 in computing system 110. Server 310 further comprises a request processor 314 and a response generator 318. A plurality of instances of the foregoing components might operate at a plurality of instances of servers (e.g., server 310) at computing system 110 and/or any portion of resource access system 300. Such instances can access each other (e.g., through a communications layer 312) and/or access a set of storage devices 330 that store various information that facilitates the operation of components of resource access system 300 and/or any implementations of the herein disclosed techniques.

Moreover, server 310 facilitates access to a set of secure resources by a plurality of users (e.g., user $102_1$, . . . , user $102_N$) at resource access system 300. Representative examples of such secure resources include a set of web services 132 hosted by server 310 and a set of content objects 134 stored in storage devices 330. The objects (e.g., files, folders, etc.) in content objects 134 are characterized at least in part by a set of object attributes 344 (e.g., content object metadata) stored at storage devices 330. Furthermore, the users are characterized at least in part by a set of user attributes 346 stored in a set of user profiles 336 at storage devices 330.

The users can request access to the secure resources at computing system 110 under a variety of configurations. Specifically, the users can issue resource access requests from any number of user devices (e.g., user device $104_1$, . . . , user device $104_N$). The resource access requests might be issued from a variety of browsers (e.g., browsers $302_1$, . . . , browsers $302_N$) and/or applications (e.g., applications $304_1$, . . . , applications $304_N$) at those user devices. Furthermore, and as shown, the user devices might be connected to computing system 110 via many types of resource access methods. The detailed features of the foregoing configurations are captured in configuration and activity fingerprints at the time the resource access requests are issued.

Specifically, and as shown, instances of resource access requests 1092 are received at request processor 314 of computing system 110. As indicated in the shown set of select request parameters 322, such requests might comprise parameters that describe various authentication information (e.g., usernames, passwords, tokens, etc.) associated with the issuing user (e.g., stored in a "user[ ]" object), information pertaining to the requested secure resource (e.g., stored in a "resource[ ]" object), information configuration and activity fingerprint (e.g., as stored in stored in a "configFP[ ]" object and/or in an "activityFP[ ]" object). In some cases, the configuration features comprising the configuration and activity fingerprint are combined and obfuscated using a hashing technique before transmission from the user devices to computing system 110. Such hashing facilitates facilitate both efficient transmission and efficient processing of the configuration and activity fingerprints. The sets of configuration and activity features 342 (e.g., hashed or not hashed) that correspond to the configuration and activity fingerprints received with resource access requests 1092 are stored in a set of configuration and activity fingerprints 108 at storage devices 330.

The configuration and activity fingerprints 108 are accessed by fingerprint processor 122 to generate a predictive model 316 characterized by a set of model parameters 326. A predictive model, such as predictive model 316, is a collection of mathematical techniques (e.g., algorithms) that facilitate determining (e.g., predicting) a set of outputs (e.g., outcomes, responses) based on a set of inputs (e.g., stimuli).

For example, predictive model 316 might consume sets of configuration and activity features 342 (e.g., as hash values, feature vectors, etc.) as inputs to predict a probability that the users associated with the respective configuration and activity fingerprints comprising the features are indeed the authorized users, rather than unauthorized users posing as the authorized users. In some cases, the techniques implemented by the model might comprise a set of equations having coefficients that relate one or more of the input variables (e.g., hash values, configuration features, etc.) to one or more of the output variables (e.g., authorized user or unauthorized user). In such cases, the equations and coefficients can be determined by a training process. In other cases, the model can map discrete combinations of inputs to respective combinations of outputs. In any case, the model parameters 326 fully specify the then-current version of predictive model 316.

When configuration and activity fingerprints that correspond to newly issued resource access requests are received, the configuration and activity fingerprints are applied to predictive model 316 by fingerprint processor 122 to produce respective outcomes from predictive model 316. As described earlier, such outcomes might pertain to a user verification probability, which is the probability that the user associated with an issued resource access request and corresponding configuration and activity fingerprint is the authorized user and not an unauthorized user posing as the authorized user. The user verification probabilities generated by predictive model 316 at fingerprint processor 122 are applied to a set of verification rules 334 stored in storage devices 330 to produce instances of user verification results 324$_1$. A set of rules (e.g., rule base) such as verification rules 334 or any other rules described herein comprises data records storing various information that can be used to form one or more constraints to apply to certain functions and/or operations.

Specifically, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. For example, verification rules 334 might comprise a conditional logic statement that returns a positive user verification result if the user verification probability from predictive model 316 is above a certain threshold, but otherwise returns a negative user verification result if the user verification probability from predictive model 316 is at or below a certain threshold.

In accordance with user verification results 324$_1$, instances of request responses 328 are submitted by response generator 318 to the user devices of the users. For example, if a positive user verification result is determined, then an "access grant" is submitted to the requestor. If a negative user verification result is determined, then an "access denial" is submitted to the requestor. In some cases, a "request alert" might be submitted to a resource owner and/or other parties (e.g., resource administrator).

The foregoing discussions include techniques for establishing a predictive model based at least in part on various instances of fingerprints (e.g., step 214 of FIG. 2), which techniques are disclosed in further detail as follows.

Figure 4:
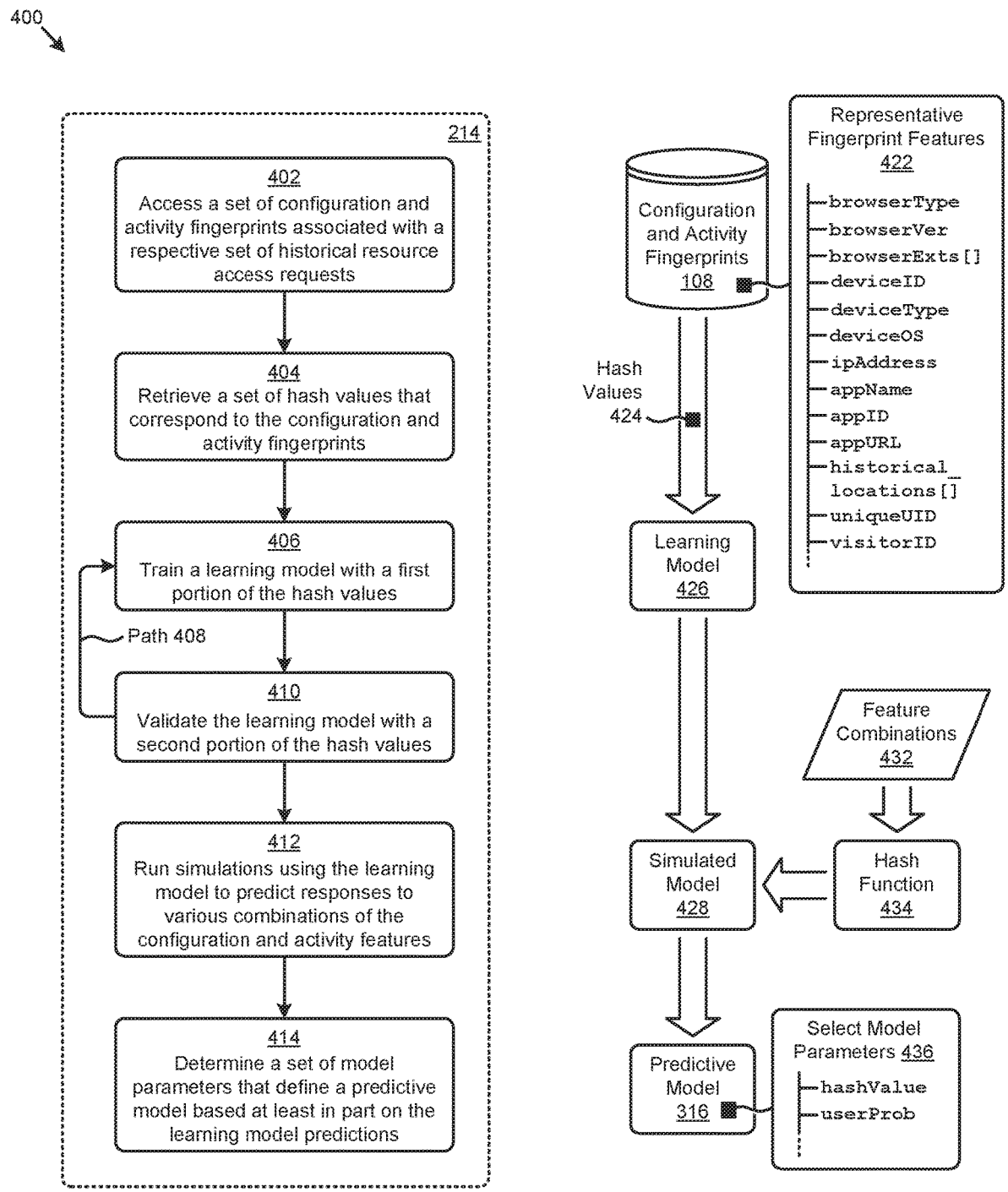
FIG. 4 depicts an unauthorized user predictive model generation technique as implemented in systems that facilitate user classification using configuration and activity fingerprints, according to an embodiment.

FIG. 4 depicts an unauthorized user predictive model generation technique 400 as implemented in systems that facilitate user classification using configuration and activity fingerprints. As an option, one or more variations of unauthorized user predictive model generation technique 400 or any aspect thereof may be implemented in the context of the architecture and functionality of the embodiments described herein. The unauthorized user predictive model generation technique 400 or any aspect thereof may be implemented in any environment.

FIG. 4 illustrates aspects pertaining to analyzing the fine-grained configuration and activity fingerprints associated with resource access events to accurately distinguish between authorized users and unauthorized users. Specifically, the figure is presented to illustrate one embodiment of certain steps and/or operations for establishing a predictive model based at least in part on various instances of configuration and activity fingerprints associated with resource access requests. As depicted in the figure, the steps and/or operations are associated with step 214 of FIG. 2. A representative scenario is also shown in the figure to illustrate an example application of unauthorized user predictive model generation technique 400.

Unauthorized user predictive model generation technique 400 commences with accessing a set of configuration and activity fingerprints associated with a respective set of historical resource access requests (step 402). The configuration and activity fingerprints might be retrieved from configuration and activity fingerprints 108 and comprise configuration and activity fingerprints from both authorized users and unauthorized users. A set of hash values that correspond to the configuration and activity fingerprints are retrieved (step 404). Such hash values are values returned by a hash or fingerprint function that represent the combination of features (e.g., properties, characteristics, etc.) of respective configurations and/or configuration and activity fingerprints.

As indicated by a set of representative fingerprint features 422, such features of configuration and activity fingerprints 108 might describe a browser type (e.g., stored in a "browserType" field), a browser version (e.g., stored in a "browserVer" field), a set of installed browser extensions (e.g., stored in a "browserExts[ ]" object), a user device identifier (e.g., stored in a "deviceID" field), a user device type (e.g., stored in a "deviceType" field), a user device operating system (e.g., stored in a "deviceOS" field), an IP address (e.g., stored in an "IPaddress" field), an application name (e.g., stored in an "appName" field), an application identifier (e.g., stored in an "appID" field), an application universal resource locator (e.g., stored in an "appURL" field), and/or other configuration properties or characteristics.

Information that comprises a fingerprint might further include a set of locations that correspond to a user's travel. For example, representative fingerprint features 422 might include an array of locations in a "historical_locations[ ]" array. Furthermore, the representative fingerprint features 422 might include a unique user ID (e.g., stored in an "uniqueUID" field) that codifies a user identification that is unique to each instance of a particular user's login or that is unique to a particular user's device, or that is unique to a particular user's browser instance, etc. For example, representative fingerprint features 422 might include an array of locations in a "historical_locations[ ]" array. In some situations, the fingerprint features 422 might include still further information such as a visitor identification code (e.g., stored in a "visitorID" field) that codifies a user identification that is unique to each instance of a browser session and/or each particular user's login to an application host or app server session. The visitor identification code can be constructed from any combination of the foregoing as well as any identifying information pertaining to the user's profile, the user's account, the user's IP address, etc., in any combination so as to generate a value. Such a value can then be stored in the "visitorID" field.

Any of the foregoing fingerprint features can be used to train a learning model. For example, in some implementations, a first portion of hash values 424 are used to train at least one learning model (step 406). A second (e.g., different) portion of hash values 424 are used to validate the learning model (step 410). The processes of training and validating can be iterated (path 408) until the learning model behaves within target tolerances (e.g., with respect to predictive statistic metrics, descriptive statistics, significance tests, etc.).

When a learning model is established and trained, simulations are run that apply various combinations of configuration features to the learning model to generate predicted responses to the varying stimuli (step 412). As shown in FIG. 4, varied instances of feature combinations 432 might hashed by a hash function 434 and applied with other unvaried stimuli to the learning model to determine a set of predicted responses. By simulating a certain set of combinations of varied stimuli, a simulated model 428 can be generated that serves to capture the full range of configuration feature variations that might be observed at the computing system.

Model parameters that define a predictive model are determined based at least in part on the learning model (e.g., learning model 426) and/or the simulated model (e.g., simulated model 428) (step 414). As an example, model parameters that characterize the predictive model 316 earlier described might be generated by unauthorized user predictive model generation technique 400. As depicted in a set of select model parameters 436, such model parameters associated with predictive model 316 might associate a user verification probability (e.g., stored in a "userProb" field) with a hash value (e.g., stored in a "hashValue" field) that is associated with a set of configuration features.

Further details pertaining to techniques for applying configuration and activity fingerprints to a predictive model to determine user verification results (step 224 of FIG. 2) are disclosed as follows.

Figure 5:
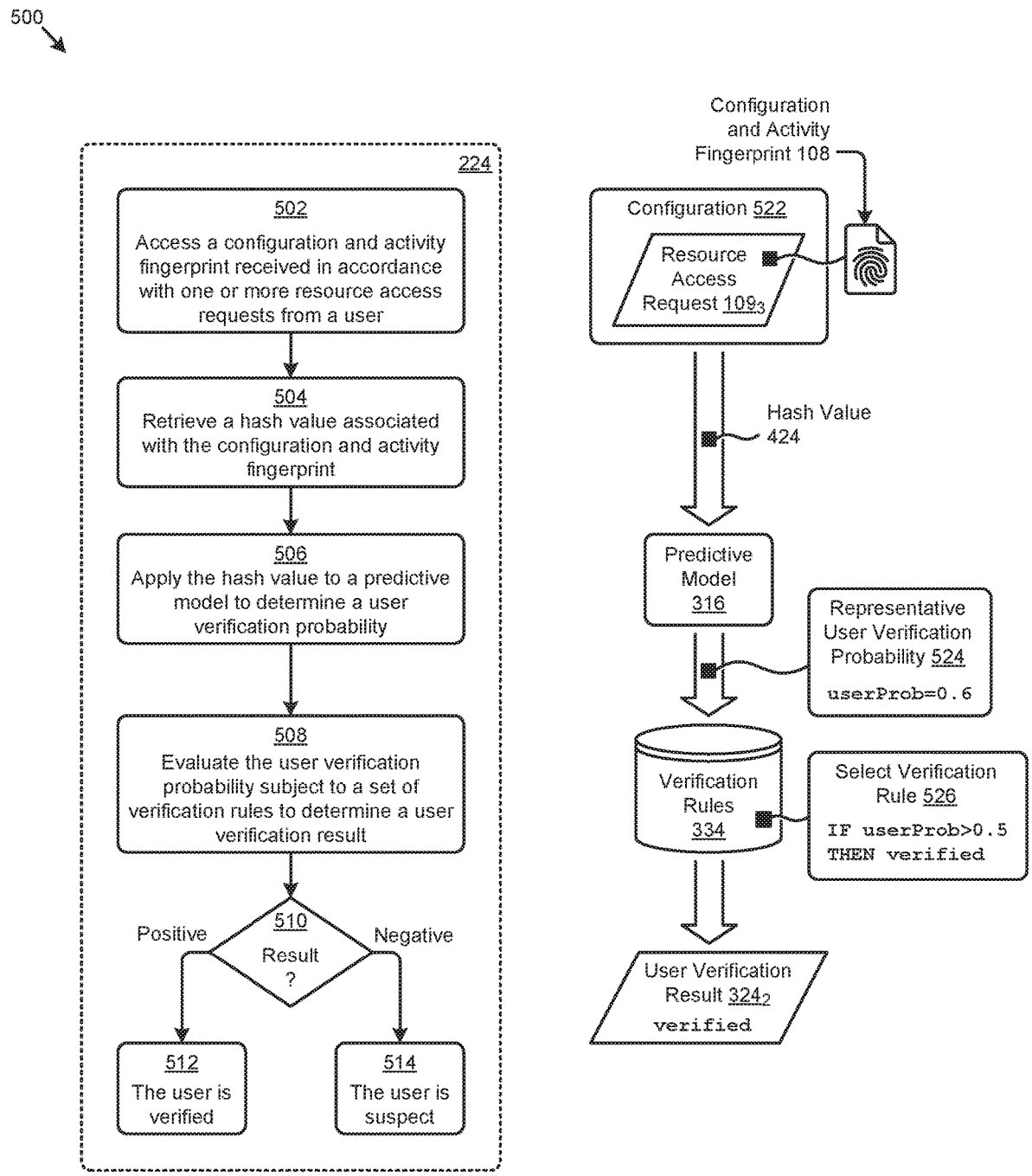
FIG. 5 presents a user verification technique as implemented in systems that facilitate user classification using configuration and activity fingerprints, according to an embodiment.

FIG. 5 presents a user verification technique 500 as implemented in systems that facilitate user classification using configuration and activity fingerprints. As an option, one or more variations of user verification technique 500 or any aspect thereof may be implemented in the context of the architecture and functionality of the embodiments described herein. The user verification technique 500 or any aspect thereof may be implemented in any environment.

FIG. 5 illustrates aspects pertaining to analyzing the fine-grained configuration and activity fingerprints associated with resource access events to accurately distinguish between authorized users and unauthorized users. Specifically, the figure is presented to illustrate one embodiment of certain steps and/or operations for applying configuration and activity fingerprints to a predictive model to determine user verification results. As depicted in the figure, the steps and/or operations are associated with step 224 of FIG. 2. A representative scenario is also shown in the figure to illustrate an example application of user verification technique 500.

User verification technique 500 commences with accessing a configuration and activity fingerprint received in association with one or more resource access requests from a user (step 502). As illustrated, resource access requests 1093 might be received under the specific conditions (e.g., user device, browser type, resource access method, etc.) of configuration 522. A configuration and activity fingerprint 108 that describes the fine-grained features of configuration 522 is issued and received together with the resource access requests. A hash value (e.g., hash value 424) associated with the fingerprint (e.g., configuration and activity fingerprint 108) is retrieved (step 504).

The hash value is applied to a predictive model to determine a user verification probability (step 506). In the scenario of FIG. 4, hash value 424 is applied to predictive model 316 to return a representative user verification probability 524. As indicated, the returned probability "userProb" is equal to "0.6". The user verification probability from the predictive model is evaluated subject to a set of verification rules to determine a user verification result (step 508). As indicated in a select verification rule 526 from verification rules 334, a user might be verified (e.g., a positive user verification result) if the user verification probability exceeds "0.5". As can be observed by the user verification result 3242 in the scenario, evaluating the user verification probability in accordance with the verification rules produces a positive user verification result ("Positive" path of decision 510) indicating that the user is verified as authorized (step 512). In other cases, evaluating a user verification probability in accordance with the verification rules might produce a negative user verification result ("Negative" path of decision 510) indicating that the user is not verified as authorized and the user is suspect (step 514).

ADDITIONAL EMBODIMENTS OF THE DISCLOSURE

Additional Practical Application Examples

Figure 6A:
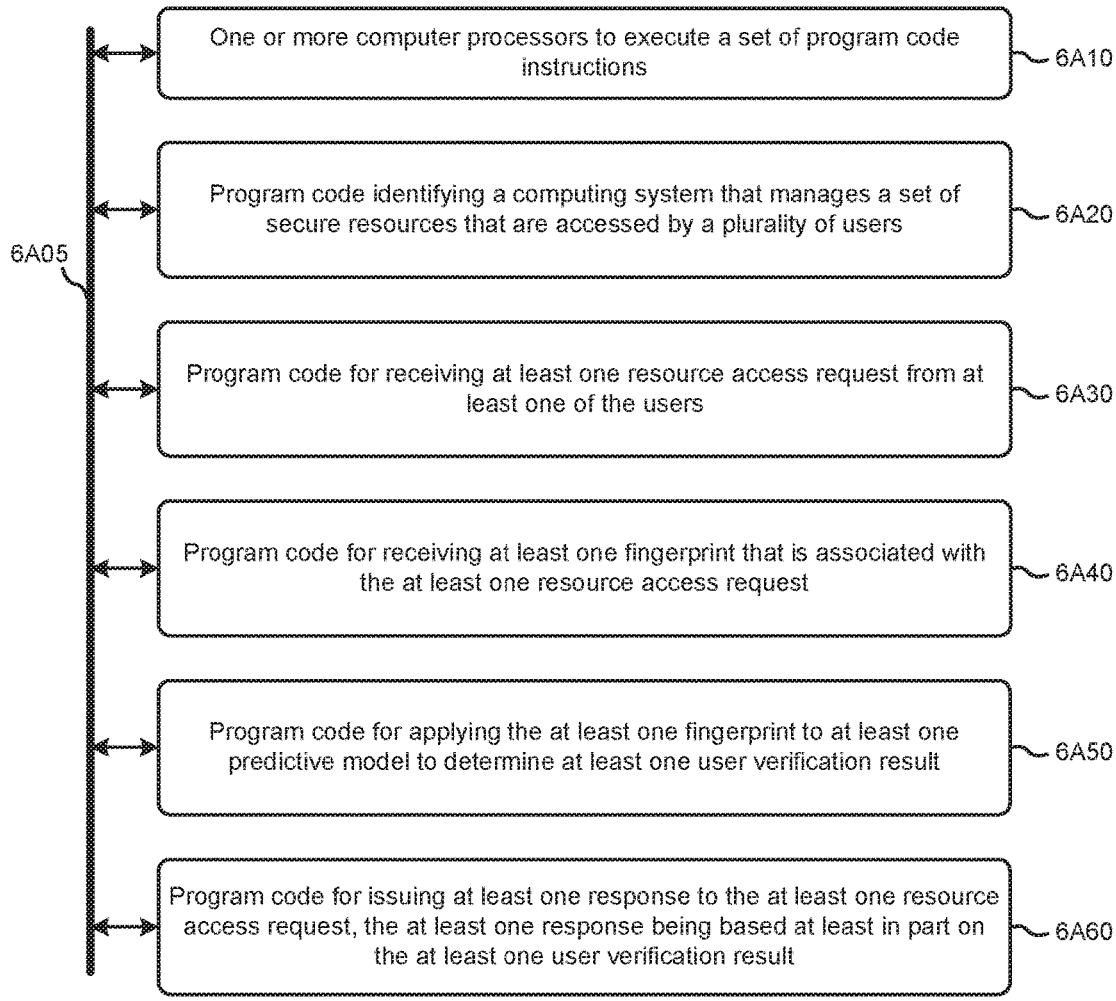
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually or as combined, serve to form improved technological processes that address falsely identifying authorized users as unauthorized users in the presence of a variety of user devices and resource access methods. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with any other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising one or more computer processors to execute a set of program code instructions (module 6A10) and modules for accessing memory to hold program code instructions to perform: identifying a computing system that manages a set of secure resources that are accessed by a plurality of users (module 6A20); receiving at least one resource access request from at least one of the users (module 6A30); receiving at least one fingerprint that is associated with the at least one resource access request (module 6A40); applying the at least one fingerprint to at least one predictive model to determine at least one user verification result (module 6A50); and issuing at least one response to the at least one resource access request, the at least one response being based at least in part on the at least one user verification result (module 6A60).

Variations of the foregoing may include more or fewer of the shown modules. Certain variations may perform more or fewer (or different) steps and/or certain variations may use data elements in more, or in fewer, or in different operations. For example, some embodiments include additional steps and processing for receiving at least one IP address that is associated with the at least one resource access request and then analyzing the at least one IP address to determine at least one travel feasibility result. Some embodiments use feature vectors and, as such, further steps and processing serve to generate feature vectors from the fingerprint, which feature vector can in turn be applied to the predictive model to determine a user verification probability. Such a user verification probability is evaluated subject to one or more verification rules. The predictive model can be established based on sets of historical resource access requests and/or other configuration and/or activity features. Furthermore, the configuration and/or activity features may describe a browser type, a browser version, occurrence and/or use of one or more browser extensions, a user device identifier, a user device type, a user device operating system, an IP address, an application name, an application identifier, and/or an application URL. Based on the user verification probability, a response to the request is issued. The response can be an access grant, or an access denial, or an alert.

Still further, some embodiments include variations in the operations performed, and some embodiments include variations of aspects of the data elements used in the operations.

Figure 6B:
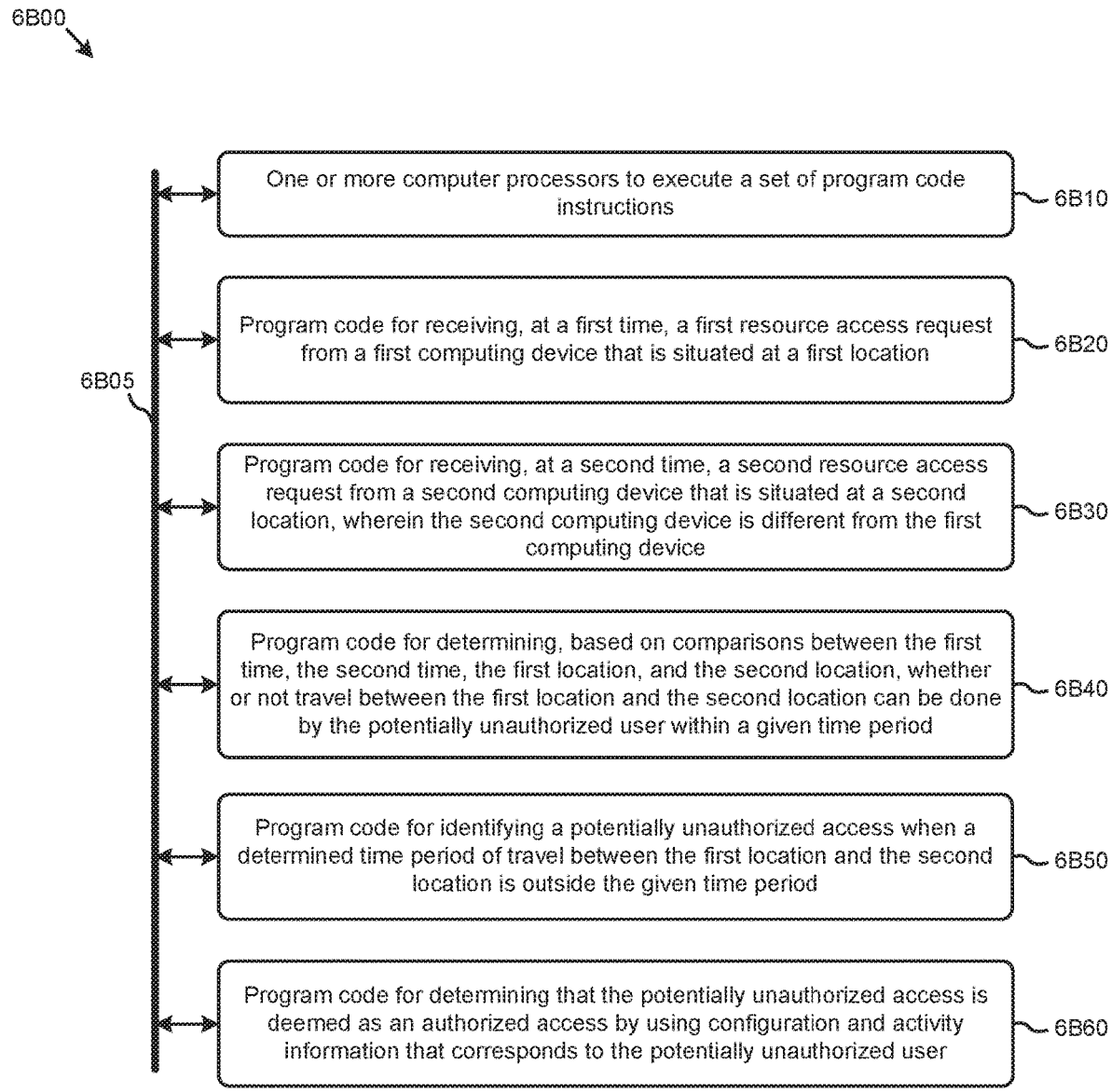

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with any other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising one or more computer processors to execute a set of program code instructions (module 6B10) and modules for accessing memory to hold program code instructions to perform: receiving, at a first time, a first resource access request from a first computing device that is situated at a first location (module 6B20); receiving, at a second time, a second resource access request from a second computing device that is situated at a second location, wherein the second computing device is different from the first computing device (module 6B30); determining, based on comparisons between the first time, the second time, the first location, and the second location, whether or not travel between the first location and the second location can be done by the potentially unauthorized user within a given time period (module 6B40); identifying a potentially unauthorized access when a determined time period of travel between the first location and the second location is outside the given time period (module 6B50); and determining that the potentially unauthorized access is deemed as an authorized access by using configuration and activity information that corresponds to the potentially unauthorized user (module 6B60).

System Architecture Overview

Additional System Architecture Examples

Figure 7A:
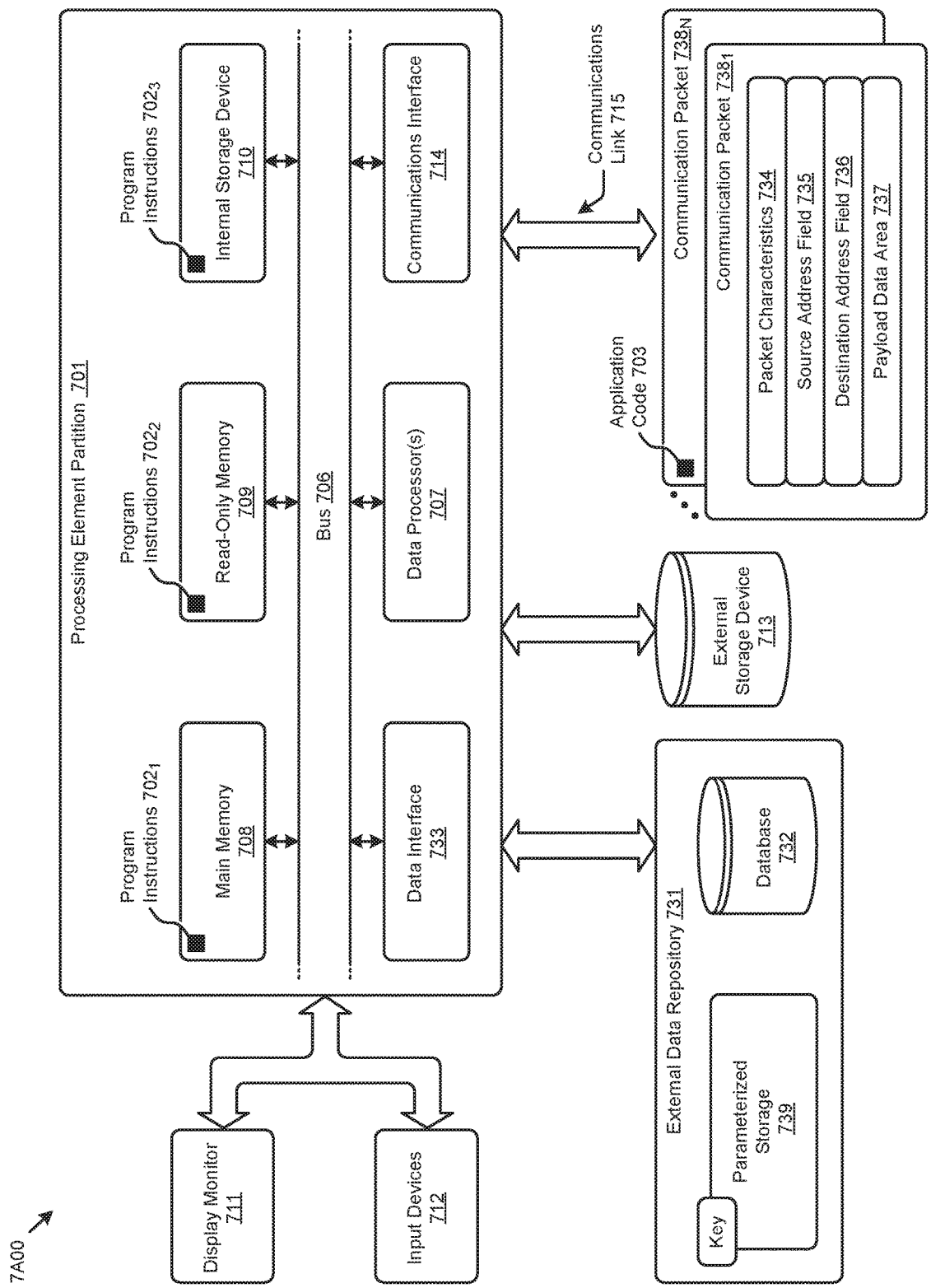
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to user classification using configuration and activity fingerprints. A module may include one or more state machines and/or combinational logic used to implement or facilitate the operational and/or performance characteristics pertaining to user classification using configuration and activity fingerprints.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of user classification using configuration and activity fingerprints). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to user classification using configuration and activity fingerprints, and/or for improving the way data is manipulated when performing computerized operations pertaining to analyzing the fine-grained configuration and activity fingerprints associated with resource access events to accurately distinguish between authorized users and unauthorized users.

Figure 7B:
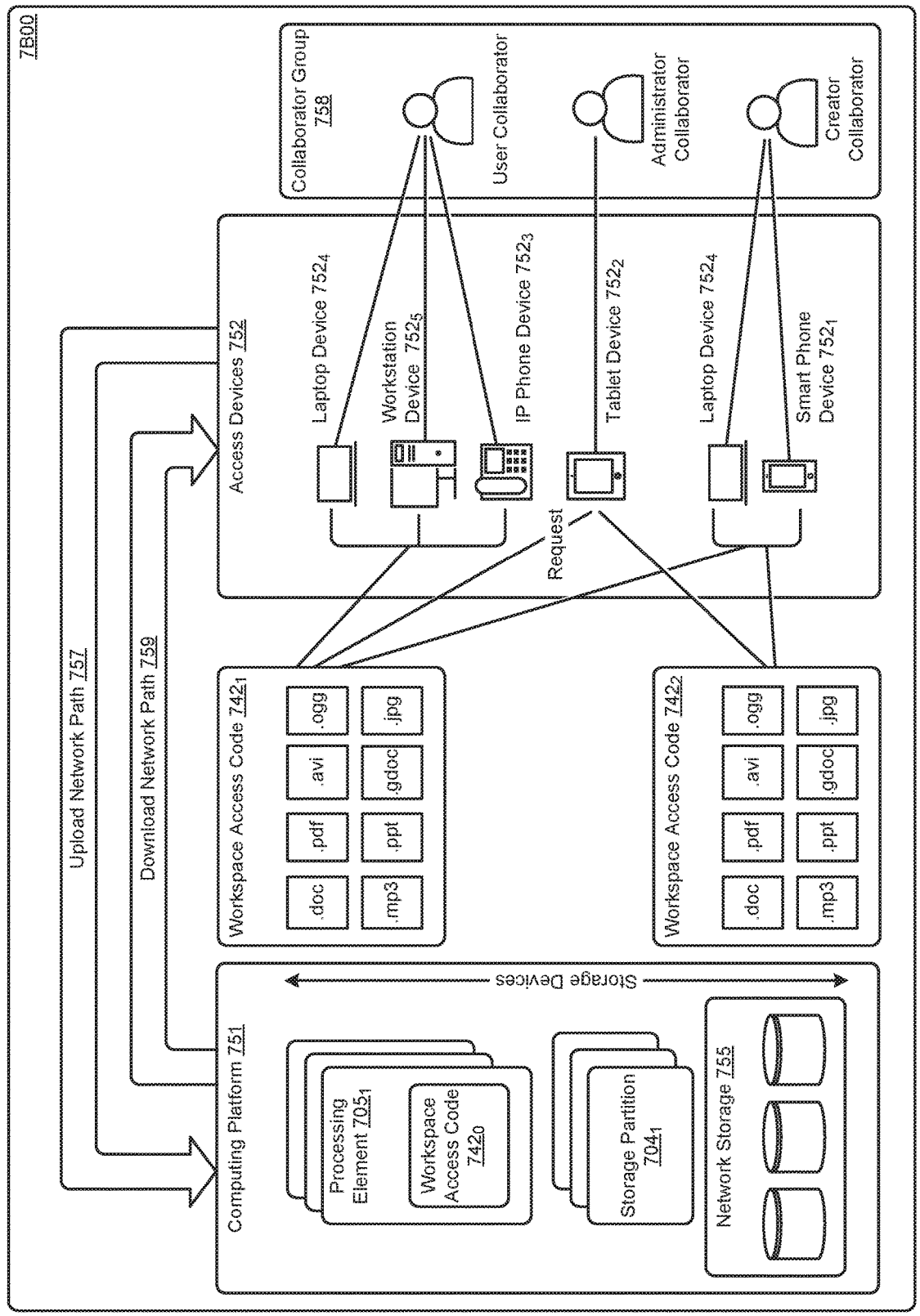

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.), and can be configured to access any type of object. Strictly as examples, such objects can be folders or directories or can be files of any filetype. A group of users can form a collaborator group 758, and a collaborator group can be composed of any types or roles of users. For example, and as shown, a collaborator group can comprise a user collaborator, an administrator collaborator, a creator collaborator, etc. Any user can utilize any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A multi-stage method for classifying a potentially unauthorized user as an authorized user, the multi-stage method comprising:

in a first stage, identifying a potentially unauthorized access corresponding to non-feasibility of travel by a user from a first location to a second location in a given amount of time by:
receiving, at a first time, a first resource access request from a first computing device that is situated at the first location;
receiving, at a second time, a second resource access request from a second computing device that is situated at the second location, wherein the second computing device is different from the first computing device;
determining, based on comparisons between the first time, the second time, the first location and the second location, whether or not travel between the first location and the second location can be done by the potentially unauthorized user within a given time period;
identifying the potentially unauthorized access when a determined time period of travel between the first location and the second location is outside the given time period; and
in a second stage, granting access to the user after identifying the potentially unauthorized access corresponding to non-feasibility of travel by the user from the first location to the second location in the given amount of time by:
determining that the potentially unauthorized access is deemed as an authorized access by using configuration and activity information that corresponds to the potentially unauthorized user.

2. The method of claim 1, wherein the determining that the potentially unauthorized access is deemed as an authorized access further comprises:
applying the configuration and activity information that corresponds to the potentially unauthorized user to a predictive model to determine a user verification result; and
authorizing the second resource access request based on the user verification result.

3. The method of claim 2, further comprising:
generating at least one feature vector from the configuration and activity information;
applying the at least one feature vector to the predictive model to determine a user verification probability; and
evaluating the user verification probability to determine the user verification result.

4. The method of claim 3, wherein the user verification probability is evaluated subject to one or more verification rules.

5. The method of claim 2, further comprising:
receiving at least one IP address that is associated with the second resource access request; and
analyzing the at least one IP address to determine the given time period.

6. The method of claim 2, wherein the predictive model is established based at least in part on a set of configuration and activity fingerprints, the set of configuration and activity fingerprints corresponding to a set of historical resource access requests.

7. The method of claim 6, wherein the predictive model is established based at least in part on one or more feature vectors, the one or more feature vectors being generated from one or more configuration features associated with the set of configuration and activity fingerprints.

8. The method of claim 1, wherein the configuration and activity information describes at least one of, a browser type, a browser version, one or more browser extensions, a user device identifier, a user device type, a user device operating system, an IP address, an application name, an application identifier, or an application URL.

9. The method of claim 1, wherein the second resource access request is received from one of a plurality of user devices and over one of a plurality of resource access methods.

10. The method of claim 1, further comprising issuing an access grant, or issuing an alert.

11. A non-transitory computer readable medium having stored thereon a sequence of instructions which, when stored in memory and executed by one or more processors causes the one or more processors to perform a multi-stage set of acts for classifying a potentially unauthorized user as an authorized user, the multi-stage set of acts comprising:
in a first stage, identifying a potentially unauthorized access corresponding to non-feasibility of travel by a user from a first location to a second location in a given amount of time by:
receiving, at a first time, a first resource access request from a first computing device that is situated at the first location;
receiving, at a second time, a second resource access request from a second computing device that is situated at the second location, wherein the second computing device is different from the first computing device;
determining, based on comparisons between the first time, the second time, the first location and the second location, whether or not travel between the first location and the second location can be done by the potentially unauthorized user within a given time period;
identifying the potentially unauthorized access when a determined time period of travel between the first location and the second location is outside the given time period; and
in a second stage, granting access to the user after identifying the potentially unauthorized access corresponding to non-feasibility of travel by the user from the first location to the second location in the given amount of time by:
determining that the potentially unauthorized access is deemed as an authorized access by using configuration and activity information that corresponds to the potentially unauthorized user.

12. The non-transitory computer readable medium of claim 11, wherein the determining that the potentially unauthorized access is deemed as an authorized access further comprises instructions which, when stored in memory and executed by the one or more processors causes the one or more processors to perform acts of:
applying the configuration and activity information that corresponds to the potentially unauthorized user to a predictive model to determine a user verification result; and
authorizing the second resource access request based on the user verification result.

13. The non-transitory computer readable medium of claim 12, further comprising instructions which, when stored in memory and executed by the one or more processors causes the one or more processors to perform acts of:
generating at least one feature vector from the configuration and activity information;
applying the at least one feature vector to the predictive model to determine a user verification probability; and
evaluating the user verification probability to determine the user verification result.

14. The non-transitory computer readable medium of claim 13, wherein the user verification probability is evaluated subject to one or more verification rules.

15. The non-transitory computer readable medium of claim 12, further comprising instructions which, when stored in memory and executed by the one or more processors causes the one or more processors to perform acts of:
receiving at least one IP address that is associated with the second resource access request; and
analyzing the at least one IP address to determine the given time period.

16. The non-transitory computer readable medium of claim 12, wherein the predictive model is established based at least in part on a set of configuration and activity fingerprints, the set of configuration and activity fingerprints corresponding to a set of historical resource access requests.

17. The non-transitory computer readable medium of claim 16, wherein the predictive model is established based at least in part on one or more feature vectors, the one or more feature vectors being generated from one or more configuration features associated with the set of configuration and activity fingerprints.

18. The non-transitory computer readable medium of claim 11, wherein the configuration and activity information describes at least one of, a browser type, a browser version, one or more browser extensions, a user device identifier, a user device type, a user device operating system, an IP address, an application name, an application identifier, or an application URL.

19. A system for classifying a potentially unauthorized user as an authorized user, the system comprising:
a storage medium having stored thereon a sequence of instructions; and
one or more processors that execute the sequence of instructions to cause the one or more processors to perform a multi-stage set of acts, the multi-stage set of acts comprising,
in a first stage, identifying a potentially unauthorized access corresponding to non-feasibility of travel by a user from a first location to a second location in a given amount of time by:
receiving, at a first time, a first resource access request from a first computing device that is situated at the first location;
receiving, at a second time, a second resource access request from a second computing device that is situated at the second location, wherein the second computing device is different from the first computing device;
determining, based on comparisons between the first time, the second time, the first location and the second location, whether or not travel between the first location and the second location can be done by the potentially unauthorized user within a given time period;
identifying the potentially unauthorized access when a determined time period of travel between the first location and the second location is outside the given time period; and
in a second stage, granting access to the user after identifying the potentially unauthorized access corresponding to non-feasibility of travel by the user from the first location to the second location in the given amount of time by:

determining that the potentially unauthorized access is deemed as an authorized access by using configuration and activity information that corresponds to the potentially unauthorized user.

20. The system of claim 19, wherein the determining that the potentially unauthorized access is deemed as an authorized access further comprises:

applying the configuration and activity information that corresponds to the potentially unauthorized user to a predictive model to determine a user verification result; and authorizing the second resource access request based on the user verification result.

\* \* \* \* \*